(No Model.)
A. B. CASE.
RATCHET AND PAWL DEVICE.
No. 373,811. Patented Nov. 29, 1887.
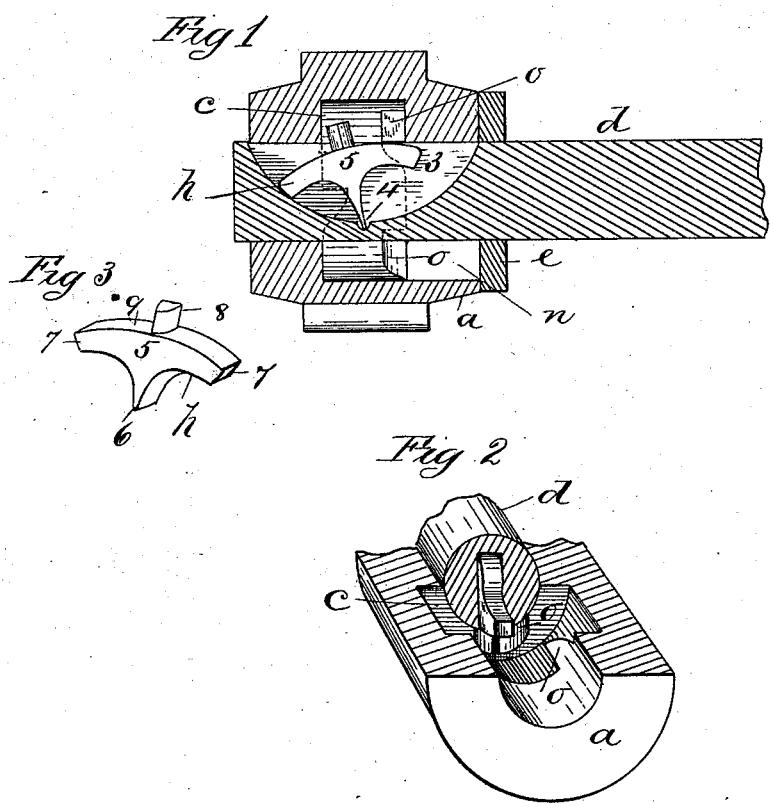
Witnesses
Inventor
Adelbert B. Case
By his Attorneys

UNITED STATES PATENT OFFICE.

ADELBERT B. CASE, OF SPRINGFIELD, MASSACHUSETTS.

RATCHET-AND-PAWL DEVICE.

SPECIFICATION forming part of Letters Patent No. 373,811, dated November 29, 1887.

Application filed August 11, 1887. Serial No. 246,656. (No model.)

*To all whom it may concern:*

Be it known that I, ADELBERT B. CASE, a citizen of the United States, residing at Springfield, in the county of Hampden and State of Massachusetts, have invented new and useful Improvements in Ratchet-and-Pawl Devices, of which the following is a specification.

This invention relates to ratchet-and-pawl mechanism, the object being to provide devices of this class of an improved construction, whereby the usual frictional wear of parts performing the functions of such mechanical constructions is to a great degree obviated, a positively-acting device is produced, and at trifling expense compared to those heretofore made.

In the drawings forming part of this specification, Figure 1 is a longitudinal sectional view of a part of a shaft and the hub of a wheel or gear having applied thereto ratchet-and-pawl devices constructed according to my invention. Fig. 2 is a perspective view of a longitudinal section of said hub, of a portion of a shaft, and the pawl, the latter being shown in an inverted position as compared to Fig. 1. Fig. 3 is a perspective view of the pawl.

In the drawings, $a$ indicates the hub of a gear or of any other wheel to which it may be desirable to attach ratchet-and-pawl connections. The said hub is cast on a suitable core, whereby an annular groove or enlargement, $c$, is formed in its inner wall about midway between the ends of the hub, and at the same time two series of ratchet-teeth, $o$, are formed on the opposite sides of said annular groove, occupying the position relative to each other shown in Figs. 1 and 2. In Fig. 1 two of said teeth $o$ are shown in full lines on one side of the groove $c$ in the hub, and one of said teeth is shown in dotted lines on the opposite side of said groove.

A shaft, $d$, is fitted to rotate within a shaft-passage through the hub $a$, which shaft-passage runs at right angles to the groove $c$, and in practice said shaft extends through the hub, as shown in Fig. 1, a collar, $e$, on said shaft serving to determine the extent to which the end of the shaft enters the hub. It is obvious that it is immaterial whether the shaft rotates in the hub or the hub on the shaft. The shaft $d$ has that portion thereof which is within the hub $a$ provided with a groove, 3, extending in a line with the axis of the shaft and having a circular bottom or base, as shown in Fig. 1, and in the base of said groove about centrally between its ends is formed a socket, 4.

The pawl $h$, which is adapted to operate with the above-described hub and shaft, is shown in perspective in Fig. 3, and consists, substantially, of a segmentally-formed body, 5, having a bearing-point, 6, on which it has an oscillatory motion, two laterally-extending arms, 7, whose ends in practice strike the curved base of the groove 3 in shaft $d$ and limit the degree of said oscillatory motion in both directions, as hereinafter described, and a tooth or arm, 8, projecting from its curved border 9, which is adapted, as below set forth, to engage alternately with the said teeth $o$ on the opposite sides of the groove $c$ in the hub $a$. The said pawl $h$ is shown in Fig. 1 in operative position in the said groove 3 of shaft $d$, with its bearing end 6 in engagement with the socket 4 at the base of said groove, and one of its arms 7 against the curved base of the latter, and the tooth 8 thereon occupying a position that will cause its engagement with the tooth $o$ of the hub, which is shown in dotted lines in said Fig. 1, when the shaft $d$ is rotated to carry said arm 8 toward said tooth. The backward motion of said shaft carries one of the curved sides of said arm 8 against the curved side of one of said teeth, and causes the pawl to be oscillated and thrown toward the opposite side of the groove $c$, and in such position as to engage with the teeth on the last-named side of the groove, when the shaft is again turned forward to cause the hub to rotate with the latter. Thus when the shaft is turned backward, as above set forth, the pawl is given a constant oscillatory motion by the contact of the arm 8 with the inclined sides of the teeth $o$ on the opposite sides of the groove $c$ within the hub, and said pawl, whenever the rotary motion of the shaft $d$ is reversed, has its arm 8 carried against one of said teeth $o$ on one side or the other of the groove $c$, for said pawl occupies at such time either that position in which it is shown in Fig. 1 or the reversed oscillatory position, owing to the fact of the weight of each of the arms 7 of the pawl, which cause the latter to swing fully in one direction or the other after having received its impetus by the contact of the tooth 8 with one of said ratchet-teeth o.

It will be seen that the pawl h is so constructed relative to the depth of the groove 3 in the shaft that when it is swung fully in one direction, as in Fig. 1, the arm 7 thereof which is not in contact with the base of the groove has its curved border standing substantially in the plane of the surface of the shaft d, and consequently of the inner surface of the shaft-passage through the hub, and thereby the pawl is prevented, by the proximity of one of its arms to the inner surface of said shaft-passage, from, under any circumstances, being lifted or thrown out of the groove 3 sufficiently to disengage the bearing-point 6 of the pawl from the socket 4, and hence the pawl is surely held in proper operative position in the shaft.

To provide convenient means for putting the pawl into the hub a after it has been placed in the groove in the shaft a groove, n, is made from one end of the hub, (see Fig. 1,) leading into the annular groove c, which permits of inserting the end of the shaft into the hub while the tooth 8 of the pawl projects beyond the surface of the shaft. When the shaft has been so placed in the hub, one end of the latter is brought against the side of the collar e, which is fixed on said shaft, and thereby the open end of the groove n is kept covered, so that no dust can enter therethrough into the groove c. In practice the groove 3 in the shaft d is made of such length that it is entirely within the hub a, and therefore dust is prevented from getting into the annular groove in the interior of the hub through said groove 3.

Fig. 2 shows a longitudinal section of the hub a and a section of the shaft d transversely about on a line with the socket 4 in the base of the groove 3 in the shaft, and shows the pawl in an inverted position as compared with that which it occupies in Fig. 1.

It is obvious that instead of the groove 3 having a curved base, a groove may be made in shaft d having a bottom or base parallel with the surface of the shaft and at a sufficient depth from said surface to serve as an abutment against which the ends of the arms 7 of the pawl strike, as above set forth, and that the socket 4, to receive the bearing end 6 of the pawl, be made proportionately deeper; but it is more convenient and cheaper to form the groove 3 as shown, because it can be quickly cut with a circular mill or cutter, whereas if made with a base parallel with the surface of the shaft and not extending to and opening at the end thereof its cost would greatly exceed that of the groove 3 with a circular base.

The within-described ratchet-and-pawl construction provides devices of this class which operate with comparatively no friction, owing to the oscillating feature of the pawl and to the fact that the said motion of the latter is on such a diminutive point, and hence great durability of the parts is the result.

What I claim as my invention is—

1. A ratchet-and-pawl device consisting of a shaft having a longitudinal groove therein and a socket, 4, in the base thereof, and a pawl, h, located in said groove and having the tooth 8 and a bearing-point, 6, said pawl being capable of an oscillating motion within said groove, combined with a hub, a, having a shaft-passage therethrough, and an annular enlargement having on the opposite sides thereof a series of ratchet-teeth, o, with which the tooth on said pawl engages, substantially as set forth.

2. A ratchet-and-pawl device consisting of a hollow hub having an annular groove in its inner wall and ratchet-teeth on the opposite sides of said groove, combined with a shaft having a longitudinal groove therein having a curved base, said shaft entering said hub, and a pawl having a bearing-point engaging with the base of said groove, and a tooth thereon engaging with said ratchet-teeth and having an oscillating motion in said groove, substantially as set forth.

ADELBERT B. CASE.

Witnesses:
G. M. CHAMBERLAIN,
H. A. CHAPIN.